F. R. McCARTY.
MANDREL FOR MAKING INNER TUBES FOR PNEUMATIC TIRES.
APPLICATION FILED MAR. 19, 1919.

1,344,702.  
Patented June 29, 1920.

INVENTOR  
F. R. McCarty.  
BY  
Fred G. Dieterich  
ATTORNEYS

UNITED STATES PATENT OFFICE.

FLORENCE RICHARD McCARTY, OF ERIE, PENNSYLVANIA.

MANDREL FOR MAKING INNER TUBES FOR PNEUMATIC TIRES.

1,344,702. Specification of Letters Patent. Patented June 29, 1920.

Application filed March 19, 1919. Serial No. 283,544.

*To all whom it may concern:*

Be it known that I, FLORENCE RICHARD McCARTY, a citizen of the United States, residing at Erie, in the county of Erie and State of Pennsylvania, have invented a new and Improved Mandrel for Making Inner Tubes for Pneumatic Tires, of which the following is a specification.

My invention has reference to improvements in the art of manufacturing inner tubes for pneumatic tires.

It is well known in the manufacture of inner tubes, that the rubber tubes are made on mandrels of steel tubing or aluminum. About nine-tenths are made on steel tubing; the remainder on aluminum tubing.

When the rubber tubes are formed on steel tubing mandrels and the said rubber tubes are cured in live steam, the steel tubing mandrel rusts and pits very quickly on the surface, making the rubber tube look very blotchy and also making it necessary that the steel tubing be renewed after being used but a short time.

Mandrels of aluminum tubing or poles are not stiff enough to stand up to the requirements, when forming the rubber inner tubes thereon, since they bend or bow after being used a short while.

My invention specifically has for its object to provide a bimetallic mandrel composed of steel or iron, preferably steel tubing covered with aluminum, the aluminum being applied to the iron or steel tubing by drawing or in any other suitable manner.

With the above objects in mind, my invention embodies the improved construction of mandrel, that may be either straight or annular, for the purpose stated, as set out in the following description and particularly defined in the appended claims.

In the drawings:

Fig. 3 illustrates a modified construction of my improved mandrel as hereinafter again referred to.

Figure 1:
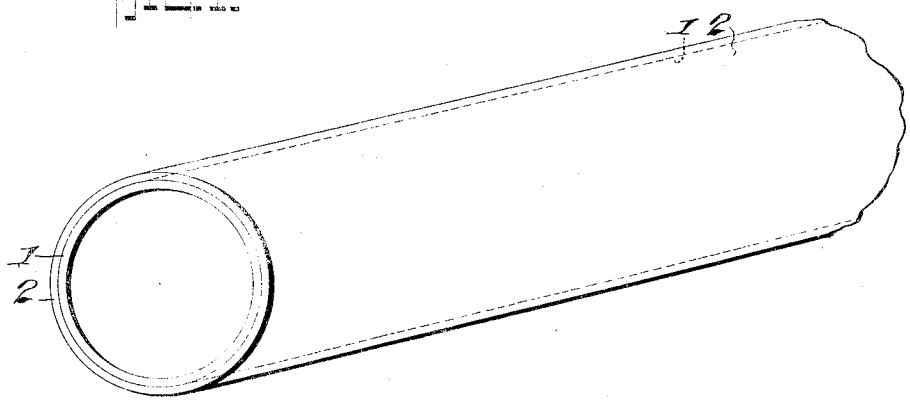
Figure 1 is a perspective view of a portion of a straight mandrel embodying my invention.
Figure 2:
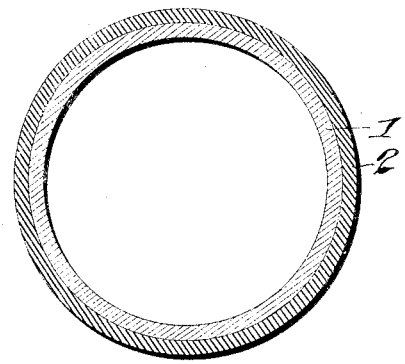
Fig. 2 is a cross section thereof on a somewhat enlarged scale.

In the drawings, 1 designates the tubing or core of the mandrel and 2 the aluminum covering that is applied to the tubing in any suitable manner and which constitutes the outer face of the mandrel upon which the various layers of uncured rubber are disposed when forming the structure, which, when subjected to the usual process of producing a finished article is capable of being inflated, after it is removed from the mandrel, for use in pneumatic inner tubes.

Forming the mandrel of an inner steel tubing gives the necessary strength to the mandrel and the aluminum covering allows the rubber to strip off easily and protects the mandrel against pitting or rusting, thereby making the life of the mandrel indefinite.

I am aware that iron and steel tubing covered with brass is used in the manufacture of tubes for beds and for other uses but, so far as I know, aluminum coated steel or iron tubing for use in the manufacture of rubber inner tubes or other purposes has not been heretofore employed.

Figure 3:
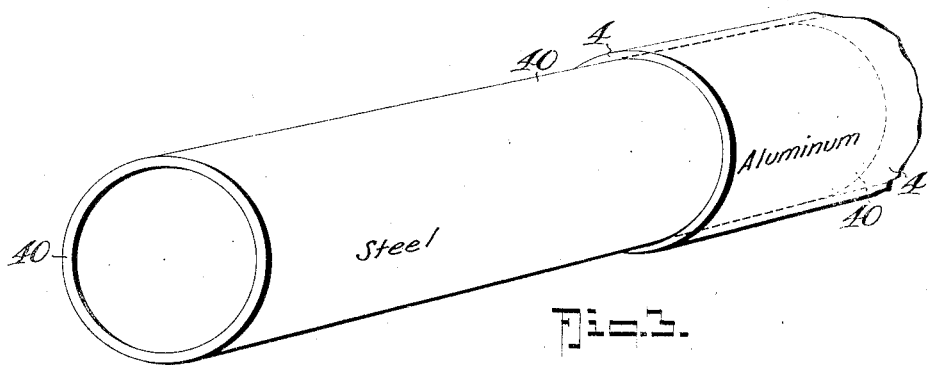

Instead of applying the aluminum exterior by drawing the same onto the steel tubing, my improved mandrel may be formed as in Fig. 3, which shows a tubing 4 of aluminum that is slidable upon and internally reinforced by an inner tubing 40 of harder metal, preferably steel.

What I claim is:

1. As an improvement in the manufacture of inner rubber tubes, an aluminum covered iron or steel mandrel on which the inner tube is to be formed.

2. A mandrel for use in the art of making inner rubber tubes, consisting of a steel tube having an aluminum covered external face.

3. A mandrel consisting of an aluminum tube interiorly reinforced by a tube of harder material.

FLORENCE RICHARD McCARTY.